INVENTOR
JOSEPH N. URBANIK
BY Feagns & Stover
ATTORNEY

Aug. 10, 1965  J. N. URBANIK  3,200,293
ELECTRICAL CONTROL FOR ELECTROMAGNETIC COUPLING
Filed May 1, 1961  3 Sheets-Sheet 2

INVENTOR.
JOSEPH N. URBANIK
BY
ATTORNEYS

Aug. 10, 1965  J. N. URBANIK  3,200,293
ELECTRICAL CONTROL FOR ELECTROMAGNETIC COUPLING
Filed May 1, 1961  3 Sheets-Sheet 3

INVENTOR
JOSEPH N. URBANIK
BY
ATTORNEY

United States Patent Office 3,200,293
Patented Aug. 10, 1965

3,200,293
ELECTRICAL CONTROL FOR ELECTRO-
MAGNETIC COUPLING
Joseph N. Urbanik, 3122 14th Ave., Kenosha, Wis.
Filed May 1, 1961, Ser. No. 106,649
2 Claims. (Cl. 317—5)

This invention relates in general to electrical control systems and more particularly to systems for controlling the speeds of electrical coupling apparatus.

A broad object of this invention is to provide a speed regulating control of electromagnetic couplings, such as clutches, brakes, dynamometers and the like.

A further object of this invention is the provision of control systems of the class described which are rugged, provide fast response, and include a solid state controlled rectifier as a speed regulating element; the provision of control systems requiring no vacuum tubes.

A further object includes the provision of a novel phase shifting circuitry in conjunction with a solid state controlled rectifier, whereby the applied gate signal is axially shifted.

Other objects of the invention, characteristic features and advantages will be in part apparent and in part pointed out as the description progresses, various possible illustrations of which are shown in the following drawings.

Corresponding reference characters indicate corresponding parts throughout the several views of the drawing.

Figures 1, 2:
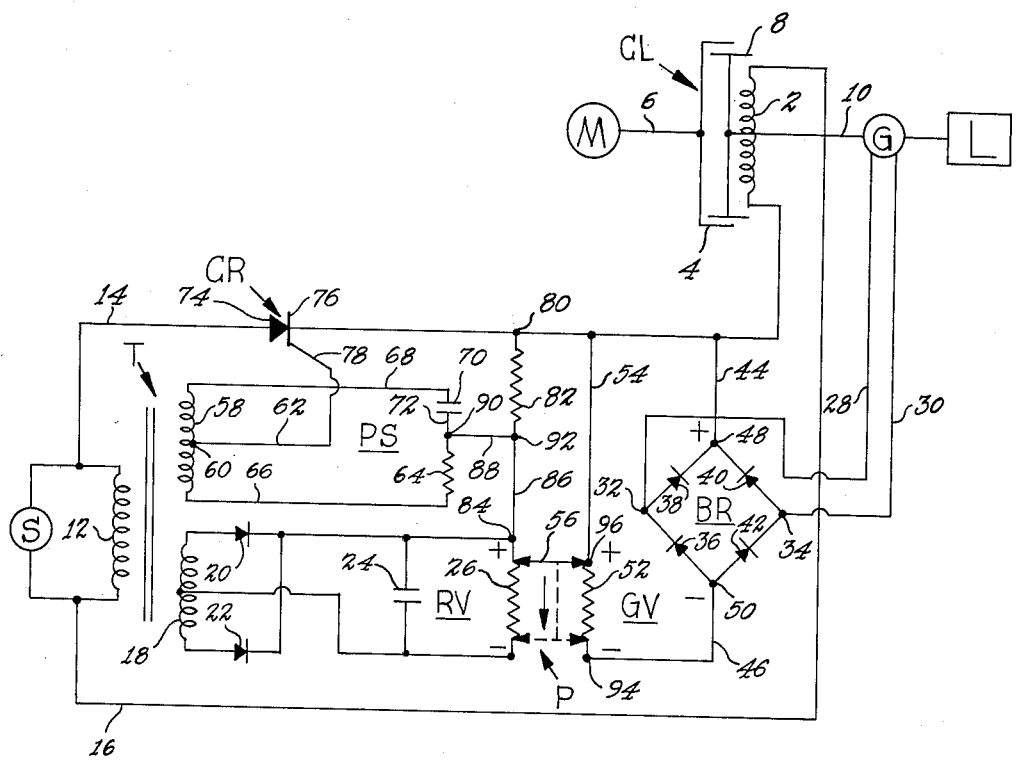
FIG. 1 is a schematic diagram of one embodiment of the invention.
FIG. 2 is a configuration of wave forms directed to FIG. 1.

Referring now to FIG. 1 of the invention, there is shown an inductive load in the form of a field coil 2 of an electromagnetic coupling. The associated coupling member is identified as CL and includes a driving member 4 driven by a prime mover M and coupled thereto by a drive shaft 6. The driven member 8 is coupled to a load L via a driven shaft 10.

Generator G, preferably an A.C. permanent-magnet type alternator, is mechanically coupled to the driven shaft 10 and its developed potential is a function of the angular velocity of the driven or output shaft 10.

For purposes of illustration, field coil 2 is series connected to an A.C. power source S and included in said series connection is a solid state controlled rectifier CR, poled in a direction to permit current flow to said field coil under conditions to be hereinafter more fully explained.

A transformer T is included in the circuitry having its primary winding 12 connected across the A.C. source output leads 14 and 16 and alternating current is fed through the primary winding 12 from said A.C. source.

A reference voltage portion of the circuitry is shown generally as RV and includes a secondary winding 18 of transformer T. Secondary winding 18 forms a part of a well-known center-tap full wave rectifier circuit and includes properly poled rectifiers 20 and 22. The output of said rectifier circuit is filtered across a capacitor 24 thereby providing a smooth continuous flow of direct current across a resistance 26. Resistance 26 forms a part of a speed setting potentiometer P hereinafter more fully explained.

A governed voltage circuit which includes a feedback voltage developed by generator G is shown generally as GV. Output leads 28 and 30 of generator G are connected to a full wave bridge rectifier BR at points 32 and 34, respectively. The bridge rectifier circuit includes rectifiers 36, 38, 40, and 42, and its D.C. output is taken across a pair of output leads 44 and 46. Output lead 44 is connected to a junction point 48 in the rectifier bridge circuit and is shown connected on the other side to lead 14. Output lead 46 is connected to a junction point 50 of the bridge rectifier circuit and also to one end of a resistor 52. The other end of resistor 52 is connected by means of a lead 54 to lead 14. Resistors 26 and 52 form a part of the speed potentiometer P and are connected electrically by a movable arm 56.

A phase shifting circuit is shown generally as PS and includes an additional secondary winding 58 of transformer T. One end of secondary winding 58 is connected to a resistance 64 via a lead 66 and the other end of said secondary winding is connected via a lead 68 to one side of a reactance, shown as a capacitative reactance represented by a capacitor 70. The other side of capacitor 70 is connected to the other side of resistor 64 by means of a lead 72. The solid state controlled rectifier CR, which may be of the silicon type, is series connected between the A.C. source and one side of field coil 2 via lead 14 and comprises an anode 74, a cathode 76, and a gate 78 properly poled. The cathode side of said controlled rectifier is connected at point 80 to a resistor 82 and the other side of resistor 82 is connected to resistor 26 of the reference voltage circuit at a point 84 by means of a lead 86. Secondary winding 58 is connected from its center tap 60 by means of a lead 62 to the gate 78 of the controlled rectifier CR. To complete the gate circuit, a lead 88 is connected at a junction joint 90 between capacitor 70 and resistor 64 of the phase shift circuit and it is also connected at a junction point 92 between resistor 82 and resistor 26. The gate circuit hereinafter is referred to as including lead 62, gate 78, lead 14 extending between cathode 76 and point 80, resistance 82 and lead 88. The gate circuit may be considered as the phase shift output circuit.

The characteristic of the controlled rectifier is such that it prevents or blocks current flow from the A.C. power source S to the field coil 2 when its cathode is positive with respect to its anode. Unless a positive gate signal is applied to its associated gate 78, it will also act in a like manner to prevent current flow to the field coil even under the condition wherein its anode is positive with respect to its cathode. Assuming, therefore, that the anode of the controlled rectifier is positive with respect to its cathode, when a positive signal is applied to its gate 78, the controlled rectifier switches to a conducting state and provides the low forward voltage drop of a typical medium power silicon rectifier. It, therefore, becomes evident that a properly controlled gate signal can proportionally control current flow to the field coil 2 from the A.C. power source S.

To control the firing point of the controlled rectifier, it becomes necessary to delay the application of the gate signal to the controlled rectifier with respect to the positive anode voltage applied to the controlled rectifier CR. The phase shifting circuit PS is so arranged that retardation of the applied A.C. gate voltage from its "in" phase voltage relationship with respect to the supply voltage applied to the controlled rectifier is obtained by employing an RC phase shift network including capacitor 70 and resistance 64. The performance of this resistance-capacitance phase shifting circuit is based upon the quadrature relation of the two voltages across capacitance 70 and resistance 64 respectively; other known phase shifting circuits could readily be substituted but an R-C combination is illustrated for purposes of simplicity. The R-C phase shifting circuitry may be chosen such that an A.C. gate signal $V_G$, or $V_{G1}$ applied to the controlled rectifer is 90° out of phase with the A.C. anode voltage $V_1$ as illustrated in FIG. 2. The aforementioned 90° phase relationship is not to be considered limiting but is chosen for purposes of illustration.

To obtain an accurate degree of regulation, the A.C. gate signal applied from the R-C phase shift circuit PS is superimposed upon a D.C. signal which is developed across resistor 82. The combination of the latter signals may be considered as a referenced composite gate signal comprising an A.C. component gate signal and a D.C. component reference signal. Under operating conditions resistor 82 may be considered as a load in series with a portion of resistance 26 and a portion of resistance 52.

The polarity of the reference voltage circuitry is such that the upper portion of resistance 26 is positive with respect to its lower portion. Assuming momentarily that slider arm 56 of speed potentiometer P is placed in its lower position (illustrated by a dashed slider arm), it may readily be seen that the D.C. potential developed across resistance 26 is the maximum available in the reference voltage circuitry. This reference voltage acts as a D.C. source and is in series with resistor 52 of the governed voltage circuit GV and is also in series with resistor 82 of the gate circuit. A referenced composite gate signal is, therefore, developed between gate 78 and cathode 76 of the controlled rectifier and includes the D.C. component reference signal developed across resistance 82 and the superimposed A.C. component gate signal. When the referenced composite voltage signal is made less negative by placing the slider arm of speed potentiometer P in a downward direction toward point 94, the controlled rectifier conducts during a greater portion of the anode voltage wave since the applied D.C. reference voltage is increased. When the D.C. reference supply voltage is set to zero by placing the slider arm in its uppermost position at point 96, the controlled rectifier will cease to conduct since the D.C. reference voltage is shorted from a portion of the phase shifting circuit PS.

Figure 4:
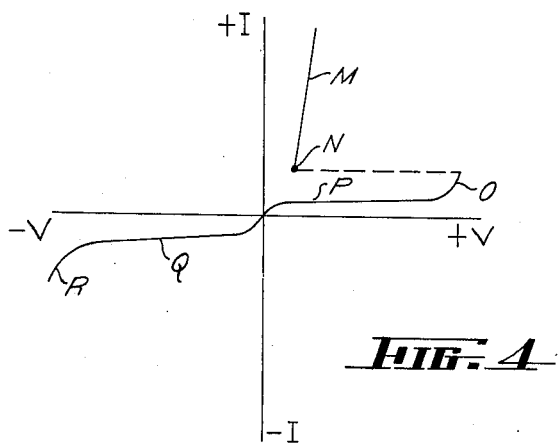
FIG. 4 illustrates a characteristic wave form of a typical solid state controlled rectifier.

The above analysis may be understood more clearly by referring to FIG. 4. Because the solid state controlled rectifier CR has a characteristic known as "holding current" it will not conduct if current drops below the minimum holding current N. Under this condition the device will return to its forward blocking state P. FIG. 4 further illustrates high current conduction M, forward breakover voltage O, reverse blocking Q, and reverse avalanche breakdown R. The area illustrated below dashed line U in FIG. 2 represents the aforementioned holding current characteristic wherein controlled rectifier CR is not capable of conduction; the area above holding current line U, in the positive portion of the A.C. anode voltage curve $V_1$ represents permissible conduction of the controlled rectifier. The magnitude of the phase shifted A.C. referenced composite gate signal $V_{G1}$ (FIG. 2) is chosen of such value that it is less than the equivalent holding current of the controlled rectifier. For purposes of clarity the magnitude of curves $V_G$ and $V_{G1}$ in FIG. 2 is exaggerated. When the D.C. reference voltage is shortened or zero, as shown in FIG. 2, the A.C. gate signal $V_{G1}$ is incapable of intersecting holding current line U and may intersect curve $V_1$ at point Z. Under this condition CR will not conduct. Should a positive voltage W be developed across resistor 82, A.C. gate signal $V_{G1}$ is superimposed thereon and penetrates the area of anode voltage curve $V_1$ above line U at point X. Under this condition the positive portion of anode voltage $V_1$ conducts during the shaded portion of the curve between points X and Z. By increasing the value of the D.C. voltage across resistor 82, it becomes readily apparent that a greater portion of the anode voltage curve $V_1$ is activated and the controlled rectifier conducts during a greater portion of the anode voltage wave.

To incorporate governing action in the control circuitry, a governed D.C. voltage signal proportional to the angular velocity of shaft 10 is applied across resistor 52 in series opposition to the reference voltage signal. The governed D.C. voltage is derived from the A.C. generator G whose output is rectified in bridge rectifier BR. The resultant D.C. output is applied across resistor 52 which constitutes a part of the speed potentiometer P. As shown in FIG. 1, slider arm 56 is connected to resistances 26 and 52, the polarities of which are in opposition. It may now be readily apparent that the developed D.C. component reference signal applied across resistance 82 is dependent upon the resultant D.C. voltage difference between the adjustable reference voltage and a portion of the opposing governed voltage.

The operation is as follows: Assuming the driving member 6 is rotating at a desired speed when motor M is properly energized, the clutch driven member 8, shaft 10, and generator G will be at a rest position if field coil 2 is not energized. With the application of current flow through field coil 2, however, driven member 8, output shaft 10, and generator G will rotate in accordance with principles well established in the eddy-current coupling art. The amount of current flow through field coil 2 and hence the rotational speed of output shaft 10 is directly dependent upon the current output from the A.C. power source through the solid state controlled rectifier CR. As previously stated, the controlled rectifier will permit passage of current from the A.C. supply to the field coil 2 providing its anode is positive with respect to its cathode and also providing a positive signal is applied to its gate. The circuitry parameters are chosen such that with the A.C. power source connected, and with the slider arm in its uppermost position at point 96, the phase shifted A.C. referenced gate signal $V_{G1}$ (FIG. 2) applied to the gate 78 is incapable of triggering the controlled rectifier since under these conditions the D.C. component reference signal across resistor 82 is substantially non-existent as previously explained with reference to FIG. 2.

With the output shaft 10 at rest and if the speed setting potentiometer arm 56 is advanced downwardly from point 96 to 50% or any desired setting, the D.C. reference voltage signal developed acros resistor 26 tends to develop a positive D.C. component reference signal W across resistor 82. Under these conditions a referenced composite gate signal $V_G$ is developed and applied to the gate circuit of the controlled rectifier. It may readily be seen from FIG. 2 that a portion of the positive cycle of the A.C. component of the referenced composite gate the A.C. component of the referenced composite gate signal $V_G$ coincides with a positive portion of the A.C. anode voltage $V_1$ which in turn satisfies the condition to trigger the controlled rectifier. The degree of conduction is shown in FIG. 2 as a shaded area. This action allows current to flow from the A.C. power source, through the controlled rectifier during a portion of the positive anode voltage cycle hereinbefore explained, thence through field coil 2 and back to the other side of the power source during alternate half cycles.

Current flow through field coil 2 causes the output shaft 10, generator G and the load to rotate; the amount of current flow through field coil 2 and hence the rotational speed of output shaft 10 is directly dependent upon the current output of the controlled rectifier CR governed by the referenced composite gate signal. To maintain the load speed at a preset setting established by the speed setting potentiometer P, the voltage developed by generator G proportional to its angular velocity is matched against the speed setting voltage in the reference voltage circuit which compensates for inceptive variations in output shaft speed and load changes. Should a greater output speed be desired, the slider arm 56 of the speed setting potentiometer may be moved downwardly in a direction towards point 94. This movement increases the D.C. component reference signal developed across resistor 82 and, therefore, the controlled rectifier conducts during a greater portion of the anode voltage wave form. Once the selected speed is established by the potential difference between the reference voltage and the governed voltage, any fluctuation of output speed will invariably change the difference potential which in turn alters the duration of the controlled rectifier conduction. This action results in reestablishing the coupling speed back to its mean setting.

It, therefore, becomes apparent that speed regulation of dynamoelectric machines of the type described utilizing a solid state controlled rectifier in a series relationship with a coupling field coil results in faster response since the characteristic of a controlled rectifier acts as a resistance in series with said coil thereby decreasing the time constant. The circuitry is simplified further since unlike a thyratron, a heater is not required. The combination is rugged with vibration problems minimized; as compared with transistors and thyratrons, the problem of heat dissipation using a solid state controlled rectifier is substantially reduced. In addition, the circuitry is compact and results in better performance and control than found in known systems.

Figure 3:
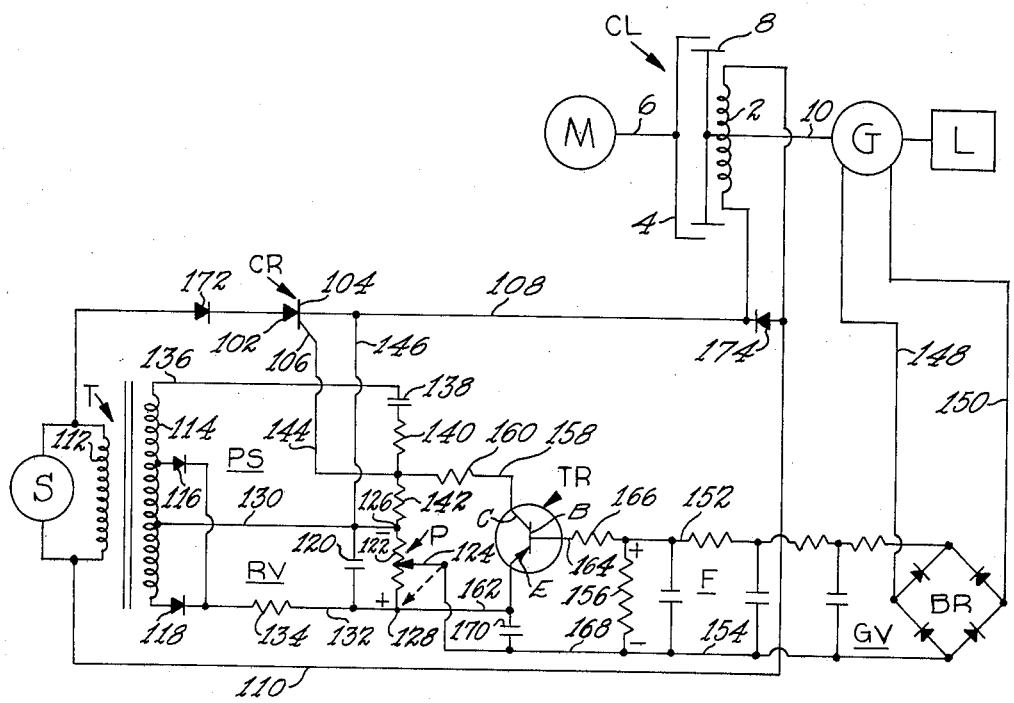
FIG. 3 shows a circuit diagram of a modification of the control system.

FIG. 3 is directed to a modification of FIG. 1 and further includes an amplification means connected between the selected reference voltage output circuit and the governed voltage output circuit. The aforesaid output circuits are selected to be of opposing polarities and the resultant differential signal is amplified, appearing as the D.C. component reference signal upon which the A.C. gate signal is superimposed. A rapid response characteristic is an inherent feature of the system.

Referring now to FIG. 3, the system includes an eddy-current clutch CL having a field coil 2 connected in a series relationship with a solid state controlled rectifier CR, said rectifier comprising an anode 102, a cathode 104, and a gate 106. Field coil 2 and CR are series connected by means of leads 108 and 110 to an A.C. power source S.

A transformer T comprises a primary winding 112 connected across the AC source and further includes a secondary winding 114, portions of which are coupled across a phase shift circuit PS and a reference voltage circuit RV, respectively.

The reference voltage circuit RV includes a conventional full-wave rectifier circuit comprising rectifiers 116 and 118, the output of which is filtered across a capacitor 120 to provide a smooth continuous flow of direct current across a resistance 122. Resistance 122 forms a part of potentiometer P having a slider arm 124 electrically connected to the output circuit of the governed voltage circuit GV as hereinafter more fully explained. The end points 126 and 128 of said resistance are connected to leads 130 and 132, respectively, lead 130 being common to both the reference voltage circuit and the phase shift circuit. A current limiting resistance 134 is shown connected to lead 132.

The phase shift circuit PS includes a portion of secondary winding 114 connected between the common lead 130 and a lead 136 which series connects a capacitor 138, a resistor 140 and load resistor 142. Capacitor 138, resistor 140, and resistor 142 are elements of an RC phase shift network, the purpose of which is to appropriately control the retardation of the A.C. gate signal from its "in" phase relationship with respect to the applied anode voltage as hereinbefore explained with reference to FIG. 1. The series connected resistances 140 and 142 are chosen such that their combined values are appropriate for securing a proper phase shift angle in conjunction with capacitor 138; resistance 142, however, is singularly common to both the phase shift output circuit and also the emitter-collector path of transistor TR as hereinafter more fully explained.

The phase shift output circuit includes a lead 144 connected between resistance 140 and resistance 142, and said lead is also connected to the gate 106 of CR. The phase shift output circuit is completed by connecting a lead 146 between the cathode side of CR and end point 126 of resistance 142.

The feedback voltage developed by generator G in the governed voltage circuit GV is connected by a pair of output leads 148 and 150 to a bridge rectifier BR comprising a plurality of properly poled rectifiers.

The D.C. output from BR is connected by means of leads 152 and 154 to a conventional filter network F and hence across a load resistor 156. The polarity of the output voltage of bridge rectifier BR is chosen such that the upper end of load resistor 156 is positive with respect to its lower end.

A transistor TR, having an emitter E, a collector C, and a base B, is connected to the governed voltage circuit GV, the reference voltage circuit RV, and the phase shift circuit PS, by means of two separate circuits. The first circuit comprises the emitter-collector path of TR including emitter E, collector C, a lead 158, a current limiting resistor 160, load resistor 142, resistor 122 and a lead 162; the second circuit comprises the emitter-base path of TR series connected to a lead 164, resistor 166, load resistor 156, a lead 168, slide arm 124, a portion of resistance 122, and lead 162. A filter capacitor 170 is connected between leads 162 and 168.

It may be appreciated from the aforementioned description that a substantially constant D.C. voltage is developed across potentiometer P. This voltage acts as a source and is of a proper polarity to render emitter E of transistor TR positive with respect to its associated collector C in the emitter-collector path.

To trigger transistor TR requires not only that its emitter be positive with respect to its collector but also its base must be negative with respect to its emitter. This latter condition is satisfied by selecting a portion of the reference voltage appearing across resistor 122 and is accomplished by moving slider arm 124 upwardly from its dashed arm position. Since the lower end of resistor 122 is positive with respect to emitter E, it becomes apparent that the voltage selected by slider arm 124 conditions base B negative with respect to emitter E.

The operation is as follows:

Assuming the driving member 6 is rotating at a desired speed when motor M is properly energized, the clutch driven member 8, shaft 10, and generator G will be at a rest position providing the field coil 2 is not energized. Driven members 8, output shaft 10, and generator G rotate in accordance with principles well known in the eddy current coupling art when current is permitted to flow through said field coil. The amount of current flow through field coil 2 and hence the rotational speed of output shaft 10 is directly dependent upon the current output from the A.C. power source through the solid state controlled rectified CR. To trigger CR into conduction, its associated anode must be positive with respect to its cathode and in addition a positive signal must be applied to its associated gate 106. Delaying the application of the gate signal to CR with respect to its positive anode voltage controls the firing point of CR and hence the subsequent energization of field winding 2. Further description of the phase shift operation is unnecessary, it being clearly understood that this aspect of the operation is defined with reference to FIGS. 1, 2, and 4, respectively.

With the slider arm (dashed lines) of potentiometer P placed at its lowermost position at point 128, the emitter-base voltage is zero, transistor TR is in a "cut-off" state and output shaft 10 is in a static condition.

By moving the slider arm 124 (solid line) in an upward direction to obtain a desired speed setting, the emitter E becomes positive with respect to base B and conduction occurs in the emitter-collector circuit resulting in a D.C. voltage drop across load resistor 142. As shown in FIG. 2, a referenced composite gate signal is developed between gate 106 and cathode 104 of CR and includes the D.C. component reference signal developed across resistance 142 and the superimposed A.C. components gate signal.

Controlled rectifier CR is therefore fired at appropriate intervals, field coil 2 is energized and output shaft 10 commences to rotate. As the angular velocity of shaft 10 increases, a feedback voltage proportional to the angular velocity of said shaft appears across load resistor 156 in the governed voltage circuit.

Since the polarity of the feedback voltage developed across resistance 156 is in series opposition to the selected portion of the voltage in the reference voltage circuit, a differential voltage signal appears in the emitter-base circuit and the magnitude of this signal continuously decreases as the shaft speed increases. A decrease in the differential voltage signal affects the magnitude of the D.C. component reference signal in a manner such that the D.C. voltage appearing across load resistor 142 is reduced and this reduction affects the firing point of controlled rectifier CR since the A.C. component gate signal, shown in FIG. 2, intersects the applied anode voltage signal during a shorter period of time.

Because the feedback voltage appearing across load resistor 156 is proportional to the angular velocity of shaft 10, this voltage may exceed the selected emitter-base voltage in the reference voltage circuit. When this occurs, base B becomes positive with respect to its emitter and transistor TR is placed in a "cutoff" condition. This action results in reestablishing the coupling speed back to its means setting. Should the speed of shaft 10 thereafter be reduced, the preselected reference voltage in the emitter-base circuit will exceed the voltage appearing across the governed voltage load resistor 156 and the differential signal will then be of a correct polarity to trigger transistor TR into conduction and subsequently reenergize field coil 2.

Unlike the circuitry described in FIG. 1, FIG. 3 includes a transistor amplifier having its emitter-collector circuit series connected to a load resistor in the phase shift output circuit and further includes its emitter-base circuit series connected between a portion of the reference voltage and the feed back voltage developed by the governed voltage circuit. An advantage of this system is the procurement of better regulation since any minute change or variation in the differential signal appearing in the emitter-base circuit of transistor TR is amplified, appears across load resistor 142, and rapidly corrects for speed setting variations.

As a protection against peak inverse voltages, a properly poled rectifier 172 may be series connected with the controlled rectifier CR. In addition, a properly poled rectifier 174 may be shunted across field coil 2 to provide a current discharge path during alternate half cycles when the system is in a nonconductive state.

Figure 5:
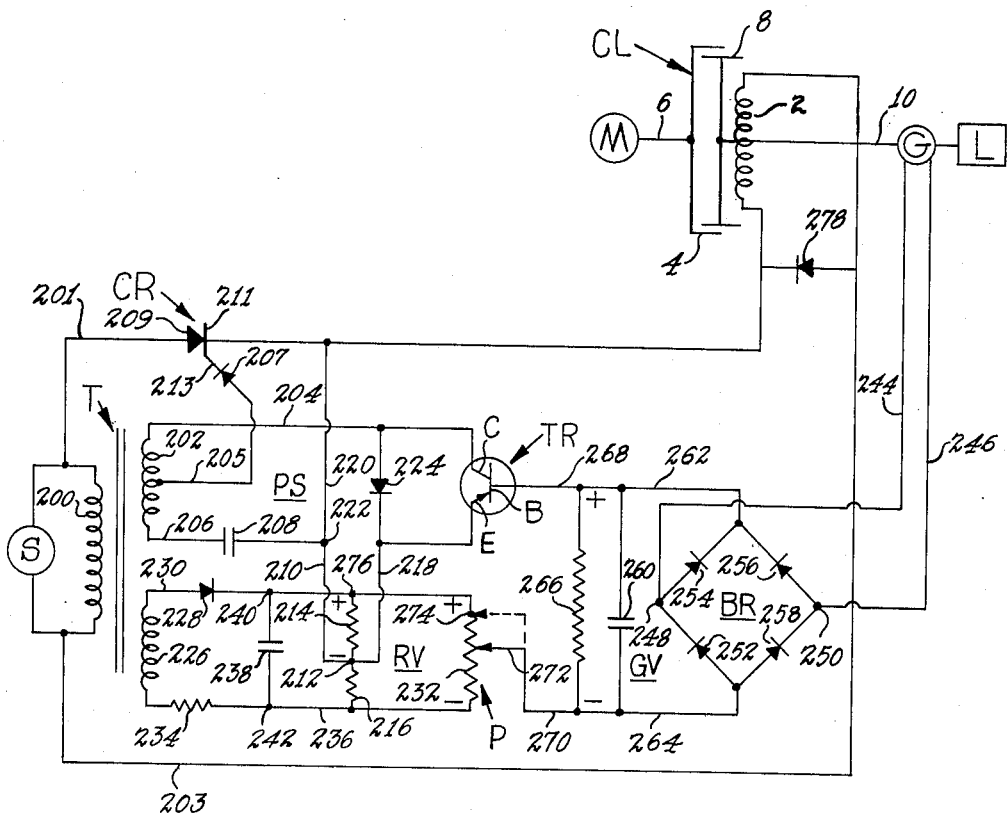
FIG. 5 is a schematic diagram of a further modification of the invention.

Referring now to FIG. 5, the circuitry shown is similar in scope to FIG. 1 and includes an eddy-current clutch CL having a field coil 2 thereon connected in a series relationship via leads 201 and 203 with a solid state controlled rectifier CR coupled across an A.C. power source S. Controlled rectifier CR includes an anode 209, a cathode 211, and a gate 213. Unlike my previously described circuitry shown in FIGS. 1 and 3, the structure includes a unique means of eliminating the necessity of superimposing a phase shifted A.C. voltage gate signal upon a D.C. reference voltage signal as hereinafter more fully explained. Transformer T may be considered comparable to the transformer shown in FIG. 1 and it comprises a primary winding 200 and a center tapped secondary winding 202.

A phase shift circuit is shown generally as PS and includes a secondary winding 202, one end of which is connected by means of lead 204 to the collector C of a transistor TR. Transistor TR is illustrated as a typical PNP transistor, comprising a base B, a collector C, and an emitter E, one requirement for its conduction being that its base B must be negative with respect to its emitter E. The other end of secondary winding 202 is connected by conductor 206 to one side of a capacitor 208. The other side of capacitor 208 is connected via lead 210 to a point 212 between resistances 214 and 216; point 212 is connected via lead 218 directly to the emitter E of transistor TR. A rectifier 224 is connected across the emitter E and collector C, respectively, of said transistor, the anode of which is connected to the collector C and the cathode of which is connected to the emitter E.

The phase shift output circuit, hereinafter referred to as a gate circuit, includes conductor 220 connected to lead 201 on the cathode side of the controlled rectifier CR and it is also connected to a point 222 between emitter E of transistor TR and one side of the capacitor 208. The gate circuit is completed by lead 205 connected from the center tap of secondary winding 202 via a properly poled rectifier 207 to the gate 213 of controlled rectifier CR. From this description it may be observed that capacitor 208 and the emitter-collector circuit of transistor TR are series connected to secondary winding 202 and the gate circuit extends from the center tap of winding 202 to the controlled rectifier CR and back to the junction point 222 between capacitor 208 and transistor TR. Transistor TR acts as a variable resistance, as hereinafter more fully explained, and, therefore, a variable resistance-capacitance network is established in the phase shift circuit PS and is applied between the gate 213 and the cathode 211 of the controlled rectifier.

A reference voltage circuit is shown generally as RV and includes another secondary winding 226 of transformer T. This circuit is shown to comprise a conventional half-wave rectifier circuit including a properly poled rectifier 228 coupled to one side of secondary winding 226 via lead 230; the cathode side of rectifier 228 is connected to one end of a resistor 232, the other end of resistor 232 being connected through a surge-limiting resistor 234 via lead 236 to the other side of secondary winding 226. A capacitor 238 is connected across secondary winding 226 at points 240 and 242 to provide a smooth continuous flow of direct current to the circuit. Connected to the output of capacitor 238 is a divider network comprising a resistor 214 in series with a resistor 216; also included in said divider network is a variable potentiometer P, including resistor 232 connected across said series connected resistances.

A governed voltage circuit which includes a feedback voltage developed by generator G is shown generally as GV. The output leads 244 and 246 of generator G are connected at points 248 and 250 to a full-wave bridge rectifier BR including rectifiers 252, 254, 256, and 258. A filter capacitor 260 is connected across the bridge rectifier output leads 262 and 264 and connected across said filter capacitor is a load resistor 266. One end of said load resistor is connected via lead 268 to the base B of transistor TR and the other end of resistor 266 is connected to a slider arm 272 of potentiometer P via lead 270.

As previously stated, the phase shift circuitry includes capacitor 208 and the emitter-collector circuit of transistor TR. The characteristic of transistor TR is such that it acts as a variable resistor, and, therefore, the network constitutes a variable resistance-capacitance phase shifting circuit. When said transistor is in a nonconductive state, the resistance of its emitter-collector circuit is at a maximum value and the circuit parameters are chosen such that the A.C. gate signal is 180° out of phase with the anode voltage applied to the controlled rectifier. This condition, shown in FIG. 6 as $V_0$, is illustrative of an "off" condition. When transistor TR is triggered to a conductive state, the resistance of its emitter-collector circuit is decreased proportionally to its degree of conduction, thereby shifting the A.C. gate signal so as to approach an "in phase" relationship to the anode voltage $V_2$. The shifted gate signal is illustrated as $V_{G2}$.

Figure 6:
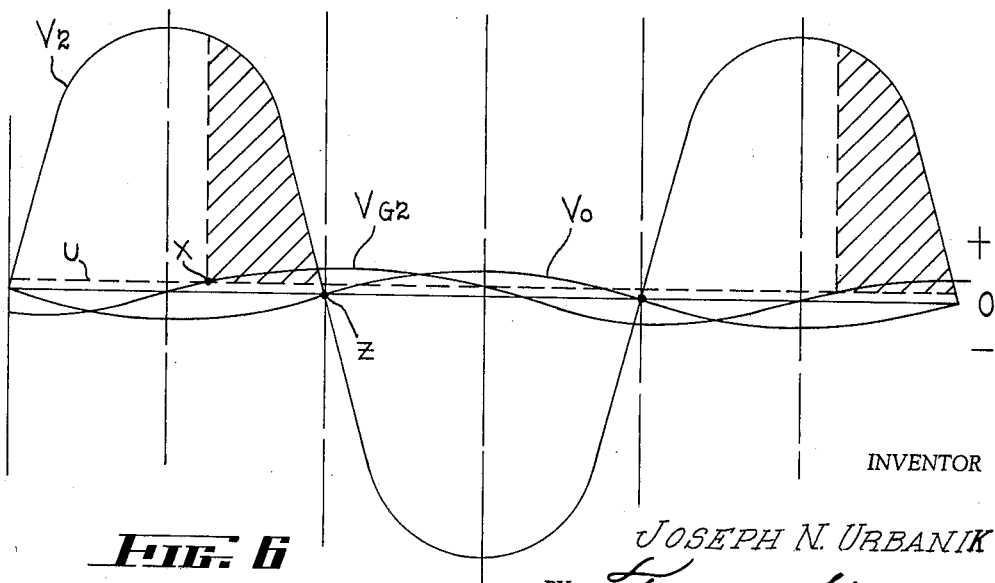
FIG. 6 illustrates wave forms directed to FIG. 5.

Should the transistor be triggered to its full conductive state, the resistance of its emitter-collector circuit is substantially zero and under this condition, the gate signal of the phase shifting circuit PS is in phase with the anode voltage. It, therefore, becomes evident that the A.C. gate signal applied to the gate 213 via rectifier 207 remains constant in magnitude, has a common axis with the anode voltage wave form and is capable of shifting axially along a common wave form axis. The degree of axial shift of the A.C. gate signal is dependent upon the degree of conduction of transistor TR. As shown in FIG. 6, wave form $V_0$ constitutes the A.C. gate signal 180° out of phase with the applied anode voltage $V_2$. Under this condition, transistor TR is in a nonconductive state and the resistance of its emitter-collector circuit is at a maximum value. Gate signal wave form $V_{G2}$ is shown in FIG. 6 shifted axially to a point X intersecting the positive cycle of the anode voltage wave form. The shaded area of the anode voltage wave indicates its firing cycle which permits current flow through the solid state controlled rectifier to the field coil 2. As previously explained in reference to FIG. 2, controlled rectifier CR is incapable of conduction below "holding current" line U as illustrated in FIG. 6.

The arrangement of the phase shifting circuit is such that on alternate half-cycles the potential developed across secondary winding 202 is such that the emitter E of transistor TR is made positive with respect to its associated collector C, and providing a negative potential is placed on base B with respect to its associated emitter E during this period of time, transistor TR will be triggered to a conductive state.

The operation is as follows: Assuming motor M is energized and the driving coupling member 4 is rotating at a desired speed, the driven coupling member 8, generator G, and load L will be at a rest position until field coil 2 is energized. Regulation of this control is accomplished by utilizing the voltage developed across potentiometer P in the reference voltage circuit RV. With the supply voltage source coupled to the circuitry and with slider arm 272 placed in its uppermost position at point 274, transistor TR is biased to an "off" condition since the voltage developed across resistor 214 places a positive potential on base B with respect to its emitter E. During this static condition, the circuitry is traced from the positive point 276 of resistor 214 to point 274 of potentiometer P, through slider arm 272 (shown as a dashed line), to lead 270, resistor 266, lead 268, base B, emitter E, lead 218 and thence to the negative side of the divider network resistor 214 at point 212.

Since the transistor TR is biased to an "off" condition during this period of time, the resistance of its emitter-collector circuit is at a maximum value and, therefore, the A.C. gate signal $V_0$ developed in the phase shift circuit PS is 180° out of phase with the anode voltage $V_2$ as shown in FIG. 6 at point Z. Under this condition, the controlled rectifier CR blocks current flow to field coil 2.

To permit current flow through controlled rectifier CR, transistor TR is activated by placing a negative potential on its base B with respect to its emitter E. This is accomplished by moving slider arm 272 in a downward direction to a desired point as shown, wherein the desired reference voltage is positive at point 274 and negative at the slider arm 272. It becomes apparent, therefore, that the magnitude and polarity of the reference voltage are of sufficient and proper values to oppose the bias voltage developed across resistor 214 to thereby trigger transistor TR to conduction.

The degree of transistor conduction is proportional to the setting on the potentiometer P and hence, the amount of current that flows from emitter E to collector C constitutes the amount of resistance seen in the phase shifting circuit. The end result is a proportional phase setting between the anode voltage and the gate signal.

Assuming the potentiometer arm 272 is set at a 50% value which is sufficient to overcome the bias across resistor 214, transistor TR is activated and the resistance is decreased in its associated emitter-collector circuit. This condition shifts the A.C. voltage signal $V_{G2}$ (FIG. 6) such that the leading edge of its associated positive half-cycle intersects the holding current line U at point X under the positive cycle of the applied anode voltage wave $V_2$. Therefore, the gate signal applied to gate 213 of CR permits the flow of current to field coil 2 during this time interval represented by the shaded area under the curve.

Under the above conditions, field coil 2 is energized, the coupling driven member 8 commences to rotate in a manner well known in the eddy-current coupling art, and the D.C. potential developed across load resistor 266 of the governed voltage circuit GV is proportional to the angular velocity of generator G. This potential is in series opposition to the tapped potential across the speed-setting potentiometer P and opposes the applied reference voltage until a mean condition is obtained. It, therefore, becomes apparent that any increase in the output member 8 will increase the generator output and the base B of transistor TR will be made positive tending to place the transistor in a cutoff condition. Under these circumstances, the collector-emitter resistance increases as hereinbefore explained, thereby shifting the phase of the A.C. voltage gate signal toward an out of phase relationship with the applied anode voltage wave form. The solid state controlled rectifier will then have a tendency to cease conduction permitting the output member 8 to reduce its speed such as to coincide with the preestablished speed set by the potentiometer P in the reference voltage circuit. Should the output member 8 reduce its speed below the prescribed speed, the opposition voltage developed across the resistor 266 is reduced proportionally thereby permitting the applied reference voltage to overcome the governed voltage to again trigger the transistor to conduction under appropriate conditions.

Rectifier 224 placed across transistor TR permits current to flow in its collector-emitter circuit during the second half of the phase shifted A.C. voltage signal appearing across the transistor.

In addition, rectifier 278 may be connected across field coil 2 poled in such a manner so as to permit a closed path for current flow in the field coil-rectifier circuit during portions of the cycle when the controlled rectifier is in a blocked state.

Reviewing FIG. 5, it becomes apparent that a unique circuitry has been presented for accurately controlling the energization of a field coil in a dynamoelectric device which incorporates the use of a solid state controlled rectifier and a variable resistance capacitance phase shifting circuit utilizing a solid state semi-conductor such as a transistor. The aforementioned combination provides for the elimination of a D.C. reference potential upon which has been customarily superimposed an A.C. phase shifted voltage signal for control purposes. The elimination of the associated D.C. reference potential not only simplifies the circuitry but even a greater degree of accurate firing points may be established since the necessity of vertically moving the A.C. phase shifted signal is eliminated. By merely shifting the A.C. phase shifted signal along an axis common to the axis of the supply voltage input signal, a more pronounced degree of regulation is accomplished.

Should a full wave rectifier system be desired, the circuits described may be substantially duplicated wherein each circuit would satisfy half-wave requirements and at last two controlled rectifiers would be needed.

Although the illustrated transistors are of the PNP type, the NPN type may be used interchangeably if the polarities of the power sources, etc. are correspondingly reversed, and D.C. generators may be substituted for the A.C. generators and associated rectifiers.

In view of the above it may be appreciated that the several objects of the invention have been attained and other advantageous results achieved.

It will be understood by those skilled in the art that various modifications of the invention may be made without departing from the spirit of the invention.

What is claimed is:

1. A speed regulating control for an electrical coupling apparatus having a rotating shaft and a direct-current field coil for varying the speed of the shaft, said control comprising terminals for connecting to a source of alternating-current, a solid state controlled rectifier having an anode, a cathode and a gate, said alternating-current source terminals being series connected to said field coil and said anode and cathode, gate circuit means connected between said gate and cathode, said gate circuit means comprising means for producing alternating-current gate signals including a phase shift circuit of the resistance-reactance type including a resistance, and a composite potential source including a resistance, the phase shift circuit and the composite potential source having a portion of their resistance in common whereby variations in output of the composite potential source produce variations in potential difference in said common resistance, said composite potential source comprising means for supplying a unidirectional reference voltage to a portion of the resistance of the composite potential source, and a transistor having an emitter, a collector and a base, the collector and the base being connected across the resistance of the composite potential source, a shaft speed-responsive unidirectional voltage source, the speed-responsive voltage source and the reference voltage source being connected in series opposition between the base and the emitter of the transistor, whereby variations in magnitude of the speed-responsive source introduce variations in magnitude of transistor current and in magnitude of direct-current component of voltage in the composite voltage source to introduce a speed-responsive component of direct voltage in the cathode gate circuit of the controlled rectifier, thereby controlling activation of said rectifier and resultant energization of said field coil.

2. A speed-responsive electrical control for an electromagnetic device having a driving member, a driven member, a field coil and a speed-responsive voltage generator driven by the driven member, said control comprising connections to said generator forming a speed-responsive unidirectional voltage source, a solid state control rectifier having an anode, a cathode and a gate, terminals for connection to an alternating-current voltage source, said field coil and said rectifier anode and cathode being serially connected to said terminals, means for controlling the conduction of said rectifier including phase-shift means, and a unidirectional reference voltage source, the phase-shift means being connected between the gate and cathode of the controlled rectifier to form a gate circuit, said phase-shift means comprising a transistor having a collector, an emitter and a base, a reactance and a source of alternating-current, with the collector and the emitter of the transistor connected in series with said reactance to the source of alternating-current whereby the emitter-collector circuit serves as a resistor in conjunction with the reactance to vary the amount of effective resistance and the amount of phase shift in accordance with the degree of excitation of the transistor, the transistor having an emitter-base circuit including said reference voltage potential and said speed-responsive voltage source in series opposition whereby variations in relative magnitude of the reference voltage and the speed-responsive voltage produce variations in the excitation of the transistor and the effective resistance of its collector-emitter circuit to vary the degree of phase-shift produced by the phase-shift circuit in the cathode gate circuit of the controlled rectifier to vary the proportion of the time during which the controlled rectifier is conducting for controlling the activation of the rectifier and thereby controlling energization of said field coil.

References Cited by the Examiner

UNITED STATES PATENTS

| | | | |
|---|---|---|---|
| 2,567,797 | 9/51 | Anderson | 323—106 |
| 2,668,921 | 2/54 | Lash | 317—5 |
| 2,748,299 | 5/56 | Weesner et al. | 310—95 |
| 2,885,621 | 5/59 | Brown | 321—18 |
| 2,897,428 | 7/59 | Wilkins | 322—79 |
| 2,977,523 | 3/61 | Cockrell | 323—22 |
| 3,095,534 | 6/63 | Cockrell | 321—40 X |

OTHER REFERENCES

Solid-State Thyratron Switches Kilowatts, Frenzel and Gutzwiller, Electronics, March 28, 1958.

SAMUEL BERNSTEIN, *Primary Examiner.*